(12) United States Patent
Raz et al.

(10) Patent No.: US 11,538,330 B2
(45) Date of Patent: Dec. 27, 2022

(54) EMERGENCY AUTOMATED GUNSHOT LOCKDOWN SYSTEM (EAGL)

(71) Applicant: Security USA Services, LLC, Albuquerque, NM (US)

(72) Inventors: Boaz Raz, Albuquerque, NM (US); Jennifer E. Russell, Albuquerque, NM (US)

(73) Assignee: SECURITY USA SERVICES, LLC, Albuquerque, NM (US)

( * ) Notice: Subject to any disclaimer, the term of this patent is extended or adjusted under 35 U.S.C. 154(b) by 1071 days.

(21) Appl. No.: 16/181,602

(22) Filed: Nov. 6, 2018

(65) Prior Publication Data

US 2019/0080577 A1 Mar. 14, 2019

Related U.S. Application Data

(63) Continuation-in-part of application No. 15/342,313, filed on Nov. 3, 2016, now abandoned.

(51) Int. Cl.
| | |
|---|---|
| G08B 25/01 | (2006.01) |
| H04N 5/247 | (2006.01) |
| G01H 3/10 | (2006.01) |
| H04W 4/90 | (2018.01) |
| G01H 3/06 | (2006.01) |
| G08B 27/00 | (2006.01) |
| G08B 21/02 | (2006.01) |
| G08B 15/00 | (2006.01) |
| H04W 4/02 | (2018.01) |

(52) U.S. Cl.
CPC ............ *G08B 25/016* (2013.01); *G01H 3/06* (2013.01); *G01H 3/10* (2013.01); *G08B 15/00* (2013.01); *G08B 21/0297* (2013.01); *G08B 27/00* (2013.01); *H04N 5/247* (2013.01); *H04W 4/90* (2018.02); *H04W 4/02* (2013.01)

(58) Field of Classification Search
CPC ....... G08B 25/016; G08B 15/00; G08B 27/00
See application file for complete search history.

(56) References Cited

U.S. PATENT DOCUMENTS

| | | | |
|---|---|---|---|
| 5,903,216 | A | 5/1999 | Sutsos et al. |
| 7,277,018 | B2 | 10/2007 | Reyes |
| 7,813,750 | B2 | 10/2010 | Hobby et al. |
| 8,588,733 | B2 | 11/2013 | Ferguson et al. |
| 8,873,719 | B2 | 10/2014 | Clawson |

(Continued)

*Primary Examiner* — Andrew W Bee
(74) *Attorney, Agent, or Firm* — Dennis F. Armijo; Rod D. Baker

(57) ABSTRACT

The Emergency Automatic Gunshot Lockdown (EAGL) System detects gunshots and executes at least one predetermined adaptive response action, such as notifying law enforcement of an active shooter, providing access control measures such as locking down soft target areas, and alerting building occupants of an active shooter situation. A gunshot is detected and verified using a triple validation system. Once a firearm is discharged, the EAGL system sends "real time" data to building officials, law enforcement, and building occupants notifying them of an active shooter situation. Simultaneously, predetermined commands are sent to access control devices for perimeter, office, classroom, and other soft target areas to lockdown and stay secure, to keep the shooter from entering these soft target areas, and to prevent shooter from entering other buildings.

23 Claims, 17 Drawing Sheets

(56) References Cited

U.S. PATENT DOCUMENTS

| | | | |
|---|---|---|---|
| 9,354,619 B2 | 5/2016 | Ergenbright et al. | |
| 9,886,833 B2 | 2/2018 | Noland et al. | |
| 2004/0036602 A1* | 2/2004 | Lerg | G08B 15/00 340/540 |
| 2014/0266721 A1* | 9/2014 | Nickles | G08B 21/02 340/541 |
| 2014/0306802 A1 | 10/2014 | Hibbs, Jr. | |
| 2014/0327519 A1 | 11/2014 | Carroll et al. | |
| 2015/0070166 A1* | 3/2015 | Boyden | G08B 25/012 340/540 |
| 2015/0170486 A1 | 6/2015 | Penland | |
| 2015/0215755 A1 | 7/2015 | Bekanich | |
| 2015/0347079 A1* | 12/2015 | Price | H04R 3/005 700/94 |
| 2015/0379861 A1 | 12/2015 | Deb et al. | |
| 2016/0006870 A1 | 1/2016 | Merjanian et al. | |
| 2017/0169686 A1 | 6/2017 | Skorpik et al. | |
| 2018/0317025 A1* | 11/2018 | Mimoun | H04R 25/65 |
| 2019/0295207 A1* | 9/2019 | Day | G08B 21/02 |
| 2019/0371160 A1* | 12/2019 | Pace | G08B 15/005 |
| 2020/0402378 A1* | 12/2020 | Connell, II | G06F 21/602 |

\* cited by examiner

EMERGENCY AUTOMATED GUNSHOT LOCKDOWN SYSTEM (EAGL)

RELATED APPLICATIONS

The present application is a continuation-in-part application of U.S. patent application Ser. No. 15/342,313 filed Nov. 3, 2016, the specification of which is incorporated herein by reference.

BACKGROUND OF THE INVENTION

Field of the Invention (Technical Field)

The claimed invention, Emergency Automated Gunshot Lockdown (EAGL) System, relates to door lockdown systems, and more particularly, to an automatic, autonomous and rapid response system using methods that combine door locking technology with gunshot detection technology while providing notification features and the control software for operating said system. The EAGL system also includes energy sensors, such as FireFly® or DragonFly™ energy sensors and a triple-validation system to detect and confirm a gunshot.

Background Art

Historically, in the event of an active shooter, the majority of violence occurs in the first five minutes of the event. Usually, it takes an average of five minutes or more for law enforcement to arrive on the scene. Law enforcement arrives on the scene with little to no event information and are sometimes ambushed and killed by the deranged shooter.

Other systems that detect gunshots are connected to a monitoring station, which depends on a monitored building authority, typically a human operator notifying a human administrator of a gunshot situation, which will require a manual activation of the emergency system. Other gunshot detecting systems trigger video feeds from the location where the event is taking place; however, the lockdown sequence still requires manual activation.

In classroom situations, some approaches require the room occupant, usually the teacher, to lock the classroom door or exterior door manually. If there is electronic access control, it is not truly "automatic" as it still requires a person to actuate the system should an active shooter start firing weapon(s) inside or outside the school. The problem with the manual approach to security is its reliance on human intervention to perform the task of performing access control, which takes a few minutes for the emergency message or notification to propagate to persons in or near the affected area to take action affecting their life safety and survivability. Another disadvantage to this security approach is the high cost of such a system.

These "state-of-the-art" security approaches are not automated and require human response to actuate the system or lock a door, to provide event notification, and too much time is lost. The notification methodologies currently in use are sluggish and sometimes inaccurate, thus, this function today is performed manually, relying primarily on the right people to be at the right place at the right time.

An example of the state of the art system is described in U.S. Pat. No. 9,886,833 to Noland, et al. This is a very complex system that specifically uses a plurality of threat sensing devices distributed throughout the inside of a facility that are hard wired to a communication circuit or communication device that is connected to a system gateway. The sensors disclosed are acoustic sensors, gas sensors, pressure sensors, and image sensors. The system gateway receives and processes the sensor data to determine if it corresponds to known threats and if it does, a predetermined system communicates the threat(s) and sends out messages. This system has a single validation system to detect a gunshot and no system to confirm a gunshot event.

SUMMARY OF THE INVENTION (DISCLOSURE OF THE INVENTION)

The Emergency Automated Gunshot Lockdown System (hereinafter referred as "EAGL" System or System) is designed to provide a rapid response to an active shooter event by accurately defining the event, initiating access control protocols that include the automatic lockdown of doors, and sending notifications to law enforcement with real-time data. The real-time data consists of shooter imagery, global positioning system (GPS) locations, and accurate and detailed weapon ballistic data.

The EAGL system is a fully automated system that locks access-controlled doors in seconds, containing or denying the perpetrator access to a certain area while allowing people in the area time to escape improving their survivability during the event. The EAGL system also automatically communicates to authorities and/or on-site security, in addition to building occupants, notifying them of an active shooter event while providing shooter imagery, GPS location of the shooter, and weapon ballistic data. The EAGL system also displays the location of the shooter, activates the wide area warning system, which may include a public-address system with emergency messages, live-streams camera video nearest the event area in real-time and activates other visual or audible wide area alarm systems. All this is accomplished in a matter of seconds, without human intervention, therefore, not subject to human error.

The EAGL system uses a novel triple-validation system to detect and confirm at least one gunshot. First, the energy sensor calculates detected energy levels to distinguish threat vs. non-threat events by processing captured energy through a max and threshold limit circuits. This distinguishes a gunshot from events such as thunder, dropped items such as books, slammed doors and the like. Each different event has a unique energy signature. The energy sensor also captures an event waveform sample evaluated by a "flat-filter" algorithm, which ensures that sharp changes exist in the sample's waveform amplitude. If sharp changes in the waveform amplitude exist (slope change), indicative of a potential gunshot event, further waveform analysis is needed. These steps represent the first two validation levels. The captured waveform sample is then sent to the EAGL system for upscaling and ballistic signature analysis, representing the third validation step to identify and determine caliber signature by comparing the captured waveform sample to the EAGL system's ballistic database. This triple validation system substantially obviates false alarms from non-gunshot events and significantly increases the accuracy of the detection of an event.

The primary advantage of EAGL system is that it provides rapid, accurate detection and validation of gunshot events and notifies key responders, typically law enforcement, of the event. The system also provides critical data such as GPS location of the event with shooter imagery as well as event ballistic data. The EAGL system can also be connected to an existing Public Address (PA) system and/or other wide area alarm notification systems or devices, such as strobe lights or klaxons to signal an active shooter event.

Further advantages of the EAGL system include performing rapid and autonomous access control features by locking down predefined areas to include perimeter doors deterring the shooter(s) access to these areas, while sending emergency messages via pre-programmed e-mail and text alerts. By performing these functions, the EAGL system provides building occupants accurate and critical lifesaving information within seconds of an active shooter event allowing better informed situational awareness to aid in making life saving decisions that involve direction to move away from the violence area. Additionally, the EAGL, system gives law enforcement real-time data so they can provide an immediate and effective tactical response to the active shooter event without themselves becoming victims.

Other or related systems, methods, features, and advantages of the invention will be or will become apparent to one with skill in the art upon examination of the following figures and detailed description. It is intended that all such additional systems, methods, features, and advantages are included within this description, within the scope of the invention, and protected by the accompanying claims.

BRIEF DESCRIPTION OF THE DRAWINGS

The accompanying drawings, which are incorporated into and form a part of the specification, illustrate several embodiments of the presently claimed invention and, together with the description, serve to explain the principles of the presently claimed invention. The drawings and figures are only for the purpose of illustrating a preferred embodiment of the presently claimed invention demonstrating only one variety of the two energy sensor types, the FireFly® and DragonFly™, and are not to be construed as limiting the presently claimed invention. Both sensor types operate the same, the only differentiator is application environment namely, FireFly® is for interior (indoor) use and Dragon-Fly™ is for exterior (outdoor) use. In the drawings:

FIG. 6D0 depicts a user interface display of program settings.

DESCRIPTION OF THE PREFERRED EMBODIMENTS (BEST MODES FOR CARRYING OUT THE INVENTION)

As utilized herein, terms such as "about", "approximately", "substantially", and "near" are intended to avow some latitude in mathematical exactness to account for tolerances that are acceptable in the trade. Accordingly, any deviations upward or downward from the value modified by the terms "about", "approximately", "substantially", or "near" in the range of 1% to 20% or less should be considered to be explicitly within the scope of the stated value.

As used herein, the term "software" includes source code, assembly language code, binary code, firmware, macro-instructions, micro-instructions, or the like, or any combination of two or more of the foregoing.

The term "memory" refers to any processor-readable medium, including but not limited to, RAM, ROM, EPROM, PROM, EEPROM, disk, floppy disk, hard disk, CD-ROM, DVD, Secure Digital (SD) card or the like, or any combination of two or more of the foregoing, on which may be stored a series of software instructions executable by a processor.

The terms "processor" or Central Processing Unit "CPU" refer to any device capable of executing a series of instructions and includes, without limitation, a general or special-purpose microprocessor, finite state machine, controller, computer, Digital Signal Processor (DSP), or the like.

The term "logic" refers to implementations of functionality in hardware, software, or any combination of hardware and software.

The term "energy sensor" is defined in this disclosure as a device capable of detecting and performing total input energy level and duration calculations using algorithms and circuitry to provide gunshot event validation and supply an event signal or input to the EAGL system for additional waveform analysis processing.

The EAGL system software integrates with a gunshot detector and an access control system that have a real-time lockdown capability. The EAGL will automatically execute one or more preprogrammed set of instructions or adaptive response actions that were inputted into the system based on the specific customer security strategy.

The EAGL system also integrates with existing security systems, such as an Internet Protocol (IP) camera system, wide area warning system that includes public address systems, and phone dialer, as well as security command and control centers. It will manage multiple buildings based on the preprogramed set of adaptive response actions.

Figure 1:
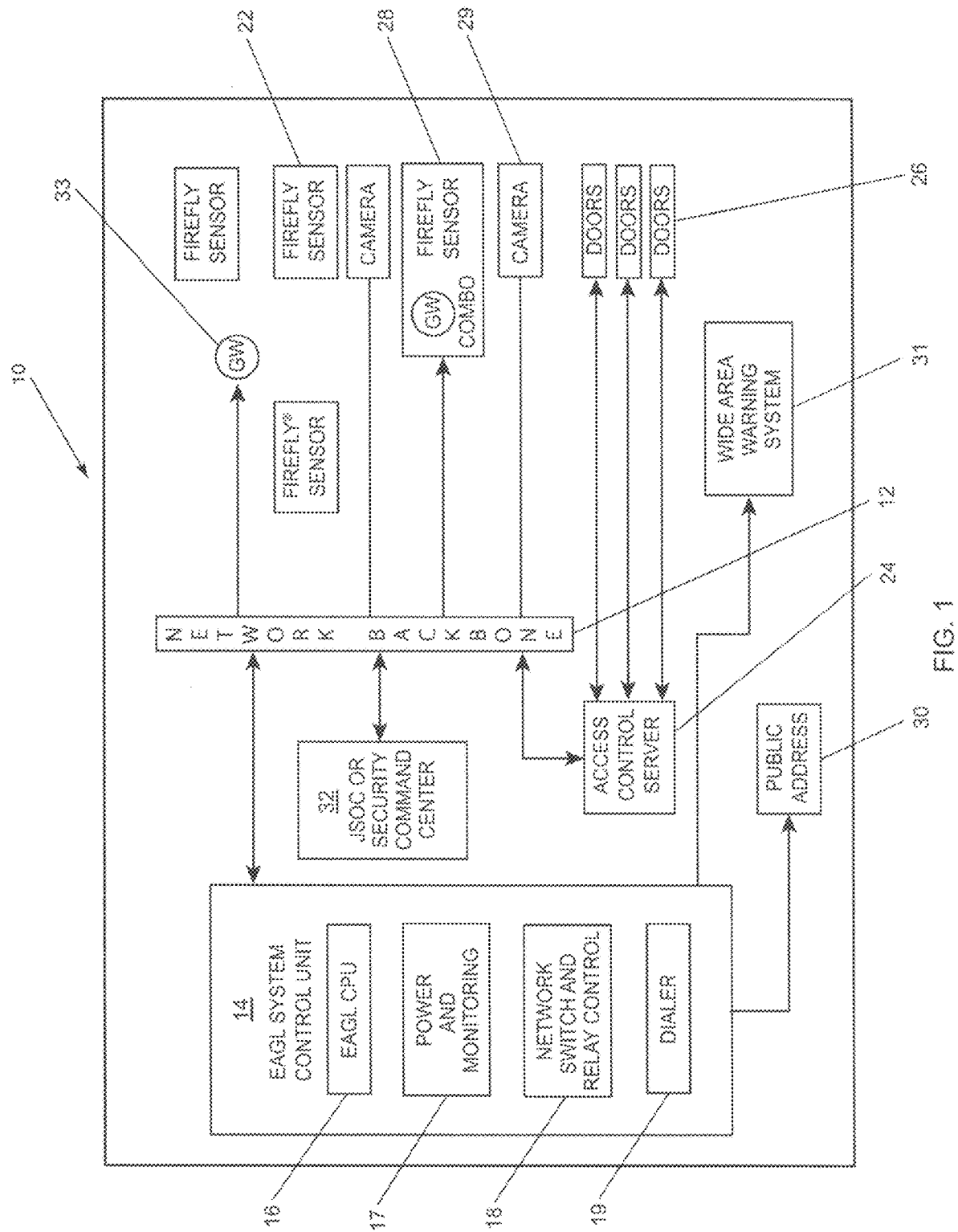
FIG. 1 shows typical EAGL system with network interface.

FIG. 1 is a high-level depiction of a typical EAGL system 10. The components include a network backbone 12 connected to each of the other components providing for two-way communication. The connection can be wired, wireless or a combination of the two. EAGL system control unit 14 typically includes EAGL CPU 16, EAGL power supply and monitoring circuitry 17, network switch and relay control circuitry 18, and dialer 19, EAGL CPU 16 provides for communication from EAGL system control unit 14 to network backbone 12. EAGL CPU 16 provides for gunshot detection control signals routed via network switch and relay control circuitry 18 to dialer 19 which provides event notification phone messaging. Energy sensor 22, such as a Firefly® or DragonFly™ energy sensor, is strategically placed to provide defined system area coverage. Multiple sensors 22 placed either in interior or exterior environments and communicate with the EAGL system 14 via gateway 33. Gateway combo 28 represents a single device that combines the functionality of a gateway 33 and an energy sensor 22 within a single enclosure. Energy sensors 22 and 28 detect gunshots, such as detecting muzzle blasts and/or energy shock waves propagating from a moving projectile. Energy sensors 22 and 28 can also provide time and direction of the gunshot. Access control server 24, such as an electronic door lock manufacturer "Kaba Eplex®" server, provides for the receipt of data from EAGL system control unit 14, to automatically trigger responsive measures during a shooter event. A plurality of adaptive response actions can be inputted into EAGL CPU 16 that correspond to user defined parameters. These can include, but are not limited to, a building layout, number of doors, location of the detected gunshot, whether the area is populated, and the like. Once one or more gunshots are detected, the preferred preprogrammed adaptive response action is automatically implemented and the applicable access control provision/system commands for controlling doors 26 and/or door groups is sent to access control server 24 for execution to either contain or limit the armed intruder(s) ability to enter and/or move freely through the facility to cause harm. Additionally, EAGL system control unit 14 can initialize wide area warning systems 31, initializing pre-recorded announcements over a PA system 30, notify law enforcement of the gunshot event, activate cameras 29 and communicate event status information to an existing on-site security command center 32 as discussed in detail in later paragraphs.

Figure 2A:
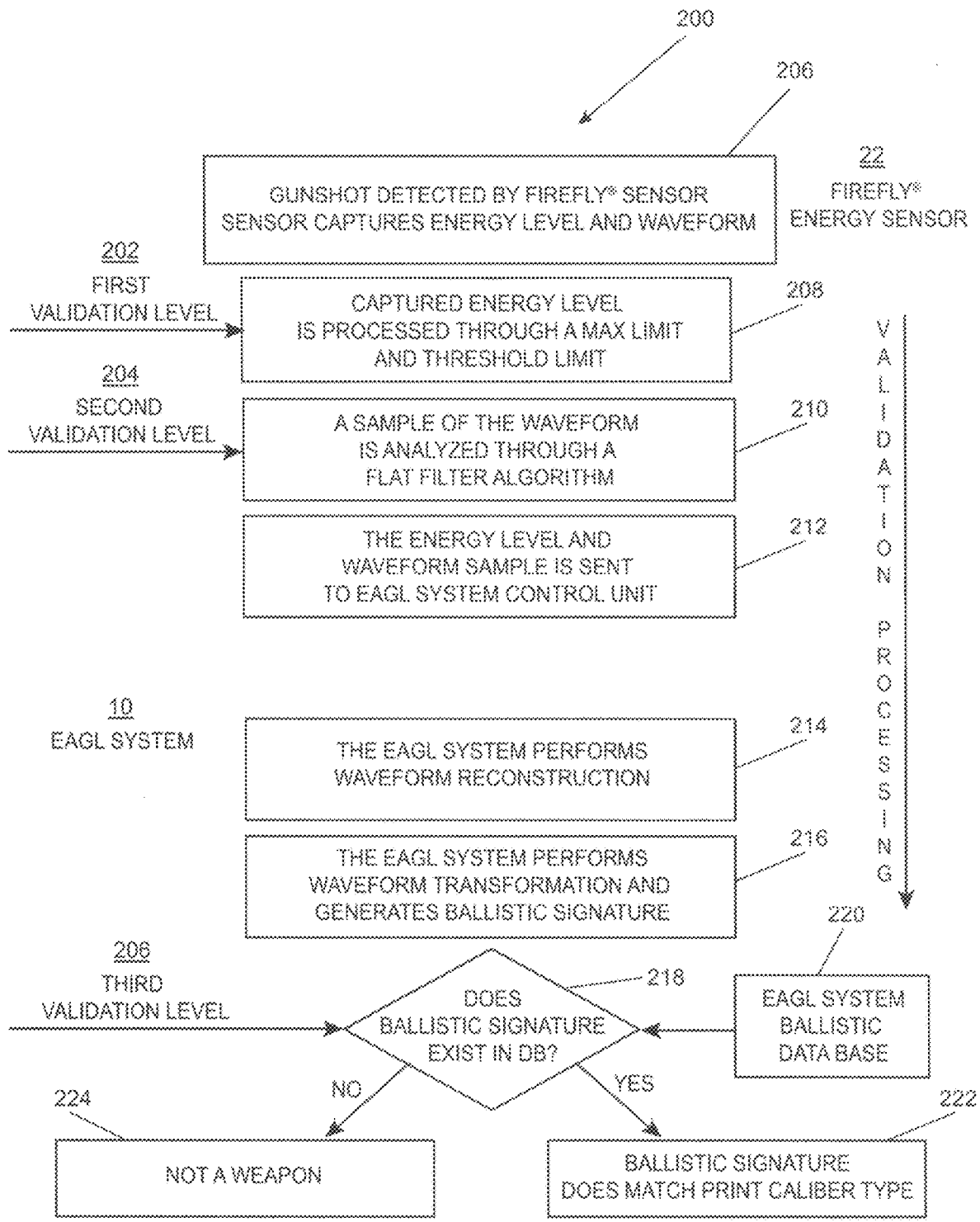
FIG. 2A shows EAGL system gunshot validation process.

FIG. 2A illustrates the EAGL system gunshot validation process 200 which consists of three validation levels 202, 204 and 206. The purpose of these validation levels is to eliminate false triggering of the EAGL system upon sensor receipt of energy levels that do not represent valid threat conditions, thus, producing either zero or near-zero false alarm conditions. All validation levels involve a processing hierarchy consisting of three distinct processing stratums and require sequential performance of these validation levels for the EAGL system to automatically initiate lockdown and notification sequences.

The first two validation levels 202, 204 are processed within the energy sensor 22. First, the detected energy level and waveform are captured 202. This energy level signal is processed through limiter circuitry and compared to define minimum and maximum thresholds 208. Second, if the detected energy level exceeds the minimum threshold but does not exceed the maximum threshold, representative of the first validation level, the captured signal waveform sample will be analyzed through a flat filter algorithm 210. This second validation level 204 also indicates that the captured energy level and sample waveform has a high probability of being a threat condition.

If the captured energy level and waveform do not meet defined threat conditions during these two validation levels, then no other processing is accomplished as the detected energy level and waveform will be deemed by the EAGL system 10 as a non-threat condition.

If the captured energy level and waveform does meet defined threat condition parameters during the first two validation levels 202, 204, then additional waveform analysis is required and performed by the EAGL system. After that, sensor 22 sends energy level and waveform sample data 212 via gateway 33, which only transmits data between EAGL system 10 and energy sensor 22, 28, without performing any processing or signal conditioning.

When EAGL system 10 gets the transmitted data representative of the captured energy level and waveform from energy sensor 22, EAGL system 10 executes three operations representing a third and final validation level 206. The three operations are waveform reconstruction 214 which entails taking the sensor's digitized signal and converting this signal to a frequency domain indicative of the range of frequencies comprising the original waveform transformation 216 using Fast Fourier Transform (FFT) algorithms, and ballistic signature generation 218 from the reconstructed and transformed waveform. When these operations are performed, the resultant ballistic signature is compared to the EAGL system ballistic data base 220. During this comparison operation, if the resultant ballistic signature matches defined caliber information in the data base 220, the EAGL system initiates 222 both lock-down and notification protocols, as well as, initiating live-video streams from the camera(s) assigned to the energy sensor(s) 22, 28 that detected the energy level and captured the waveform sample. If the ballistic signature does not match, a determination is made that it is not a weapon 224 and the processing ends.

Figure 2B:
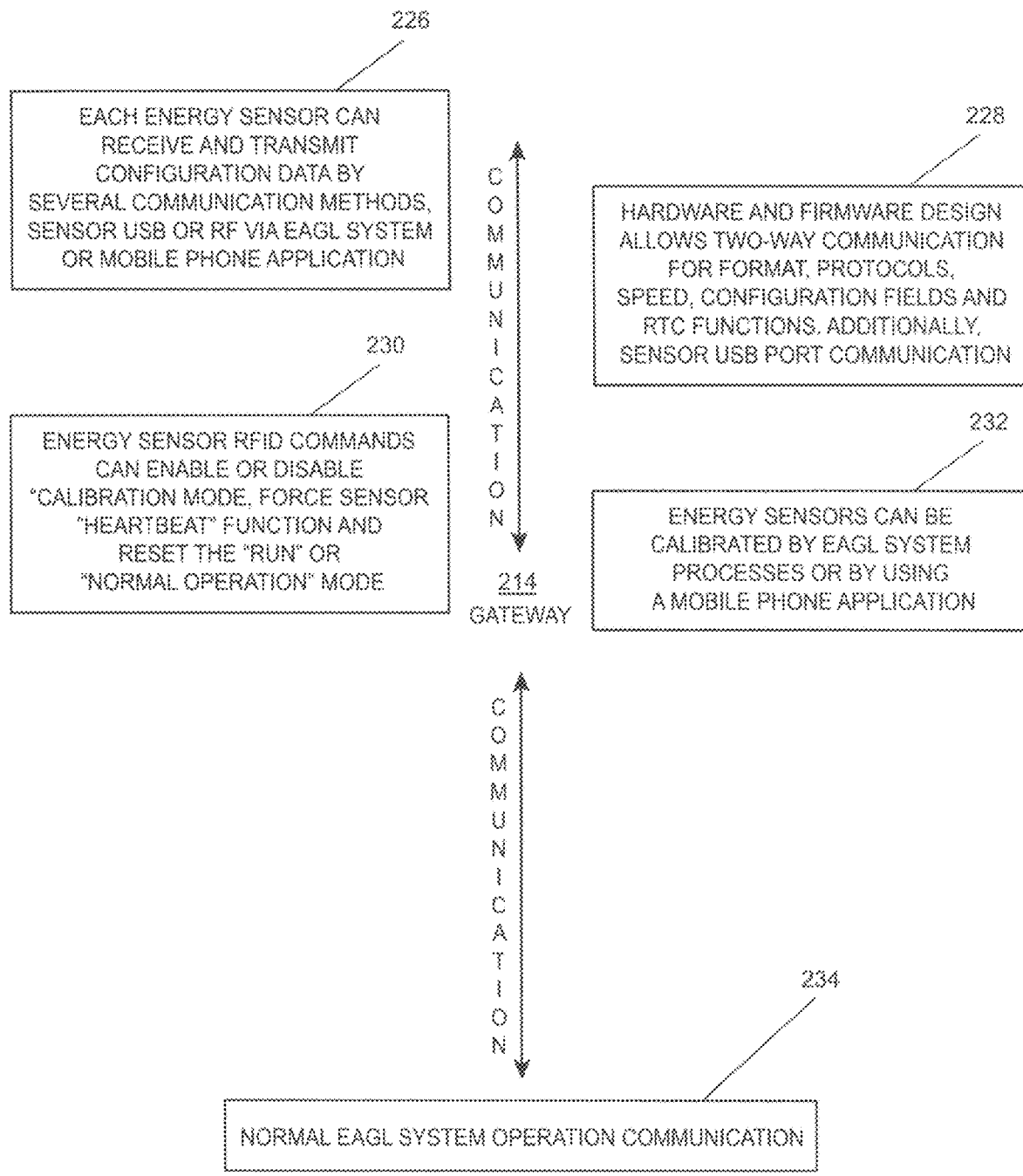
FIG. 2B shows EAGL system and energy sensor communication.

FIG. 2B is a flow diagram representing not only the primary or normal communication path 234 between energy sensor 22, 28 and EAGL system 10 via gateway 214 but also lists several other alternative data transmission methods with data types indicative for EAGL system functionality. These data types include energy sensor configuration, calibration, heartbeat, operation modes, and Real Time Clock (RTC) functions as well as format, protocols, and processing speed. These communication systems can include USB, Radio Frequency (RF) or mobile applications 226, hardware and firmware designs 228, Radio Frequency Identification (RFID) 230 and/or calibration of sensors 22 internally by EAGL system 10 of mobile phone application 232.

Figure 3A:
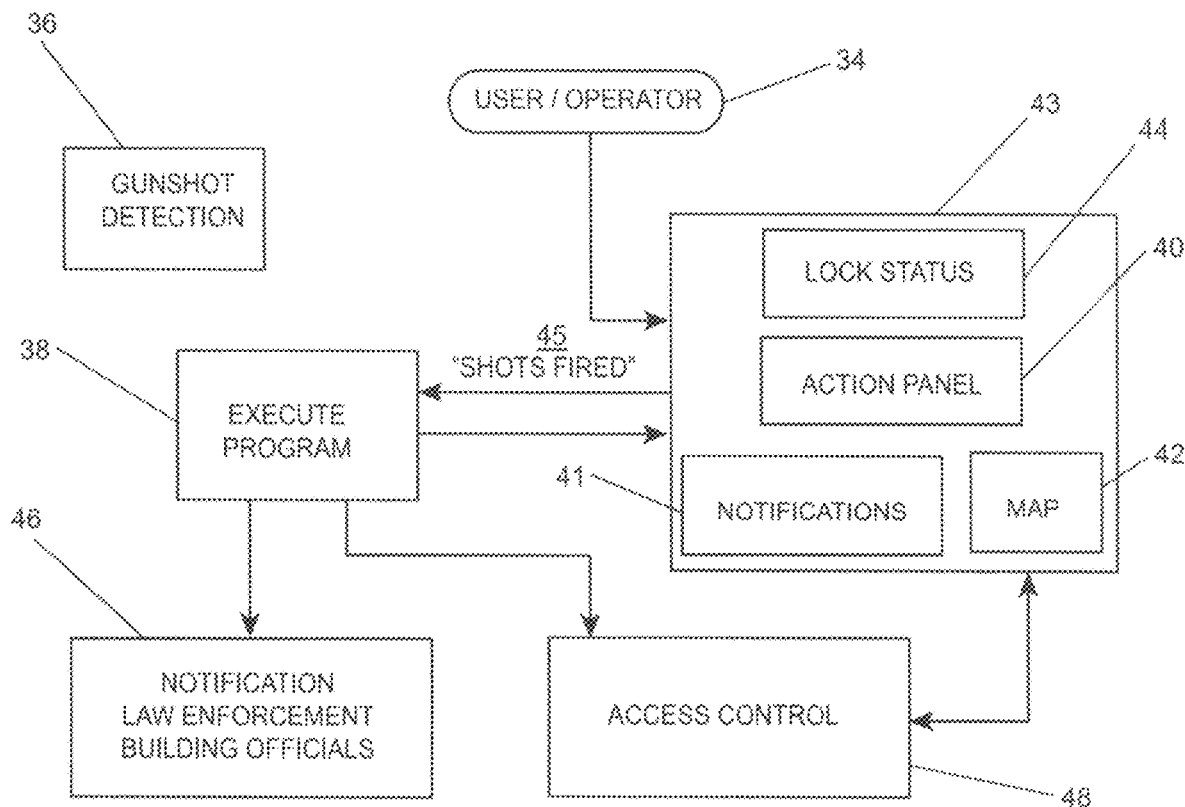
FIG. 3A shows a flow chart of EAGL system operation method.
Figure 3B:
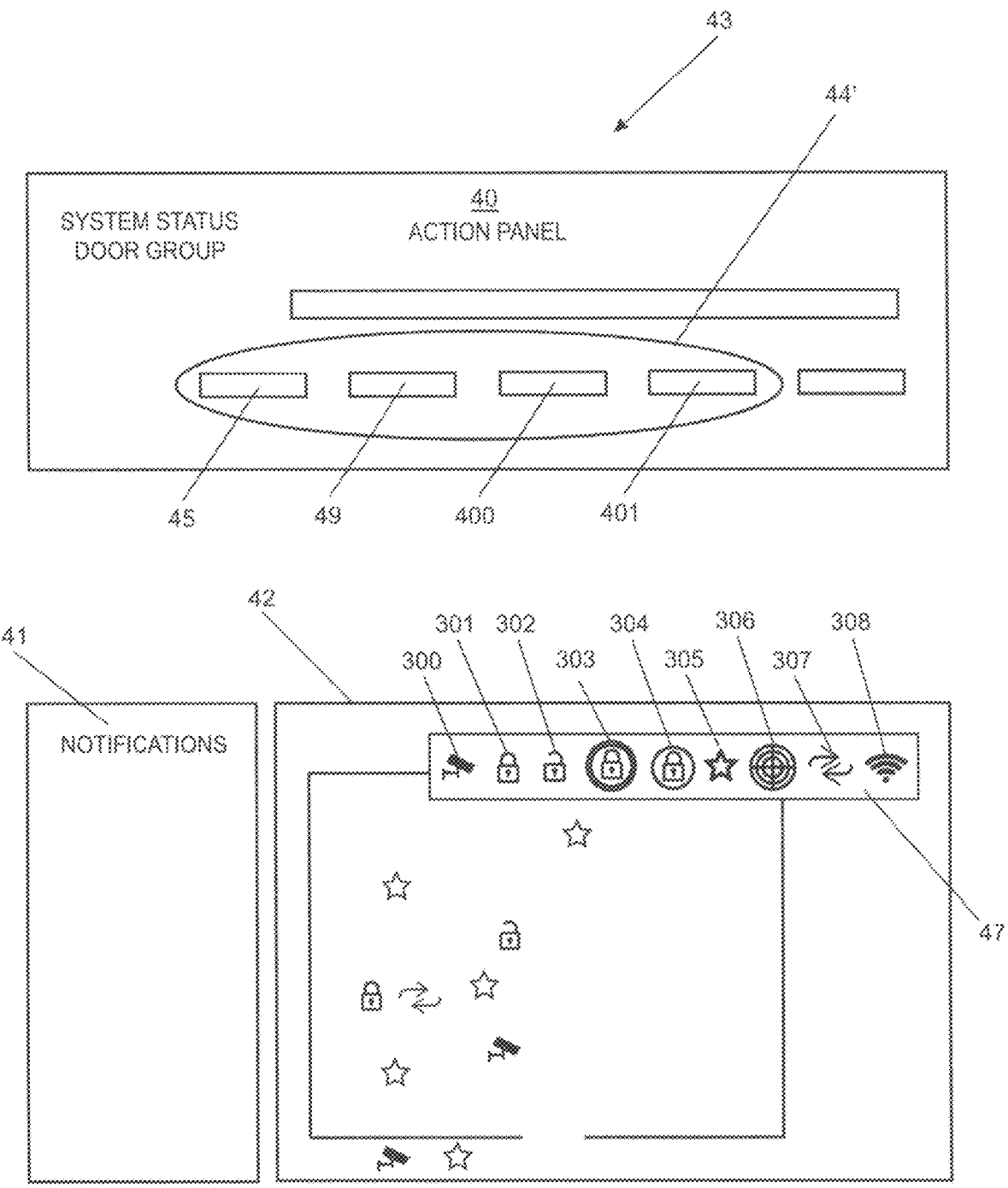
FIG. 3B shows an EAGL system user interface representation.

FIG. 3A contains a flow chart exhibiting the preferred operating method for the EAGL system and FIG. 3B illustrates user interface portrayal representing EAGL system information displayed to the user/operator. The EAGL system uses a three-level hierarchal approach through credentialing to distinguish user/operator levels. These are basic user, administrator, and integrator levels allowing for basic system operation. Advanced system control features, typical for system administration and configuration, are provided at the administrator and integrator levels. User level differentiation is assigned through the use of inputted or assigned permissions prior to EAGL system commissioning. Additionally, the System also allows for editing user permissions as well as adding and deleting users and applicable assigned permissions.

FIGS. 3A and 3B also portray system functionality in addition to gunshot detection 36 for triggering a lockdown state via execute program 38, user/operator 34 can manually trigger a programmed scenario, shots fired 45, via execute program 38 using user interface 43, such as a display. User/operator 34 commands are sent to the EAGL system through user interface 43 where action panel 40 provides for maps 42 displaying system asset deployment locations, door lock status 46, notifications 41 and other pertinent information. User/operator 34 is able to lockdown or open access controlled doors in the facility and can view real-time door lock status 44 via action panel 40. Preferred system user interface display 43 shows a building map 42 with an icon menu overlay(s) 47 on top of the facility which portrays system controllable assets, their conditions and facility location. These icons can include: video camera 300, system, normal 301, unlock 302, lockdown 303, doors not in door group 304, energy sensor 305, gunshot detection 306, EAGL system gateway 307, and EAGL system gateway combo 308. For example, a red color lock symbol indicating a locked door during lockdown 303 and the green color lock symbol indicating an unlocked door or unlock 302 condition. If gunshot detection 36 executes program 38 this information is sent to user interface 43 to display status information. Along with providing status information, execute program 38 notifies key responders namely, law enforcement by dialing 911 and/or notifies building administration officials 46. Simultaneously, access control door systems 48 are looked pursuant to the programmed adaptive response actions and sent to building map 42 for status information display. In the manual mode, the user/operator 34 manually triggers a threat situation, the door system 48 locks specific doors to either contain the shooter in a specific area or prevent access to other areas. Once a manual trigger is initiated, for example by a lockdown button being depressed, or a system integrated panic button, or a gunshot detected, the EAGL system will execute the adaptive response actions that were programed based on the specific area where the active shooter is physically located or the location of the detected gunshot.

FIG. 3B shows a typical display or user interface 43. User interface 43 display is sectioned into three areas presented on the display. These are action panel 40, notifications 41, and map 42. Action panel 40 can include a display of specific system status and functions 44 with buttons that allow for system operator interface to override the system autonomous operation by manually performing lockdown 45, unlock 49, system normal 400 functions, and shots fired 401 testing as well as provide a visual cue of system status through the use of displayed colors and verbiage and also provide aural cues through sound. Additionally, action panel 40 can provide for allowable system operator inputs to control system features that may include building access and display interface tabs or buttons that open other menus or options. Notifications 41 area of user interface 43 can display sensor status, system test, and threat detection information. Notifications 41 can display when threats are detected or when system testing performance results. Building map 42 preferably displays the location of system assets, which include sensors, cameras, door locks, asset status, and location of a detected gunshot and an icon menu 47 with assigned labels for each presented icon.

Figure 4:
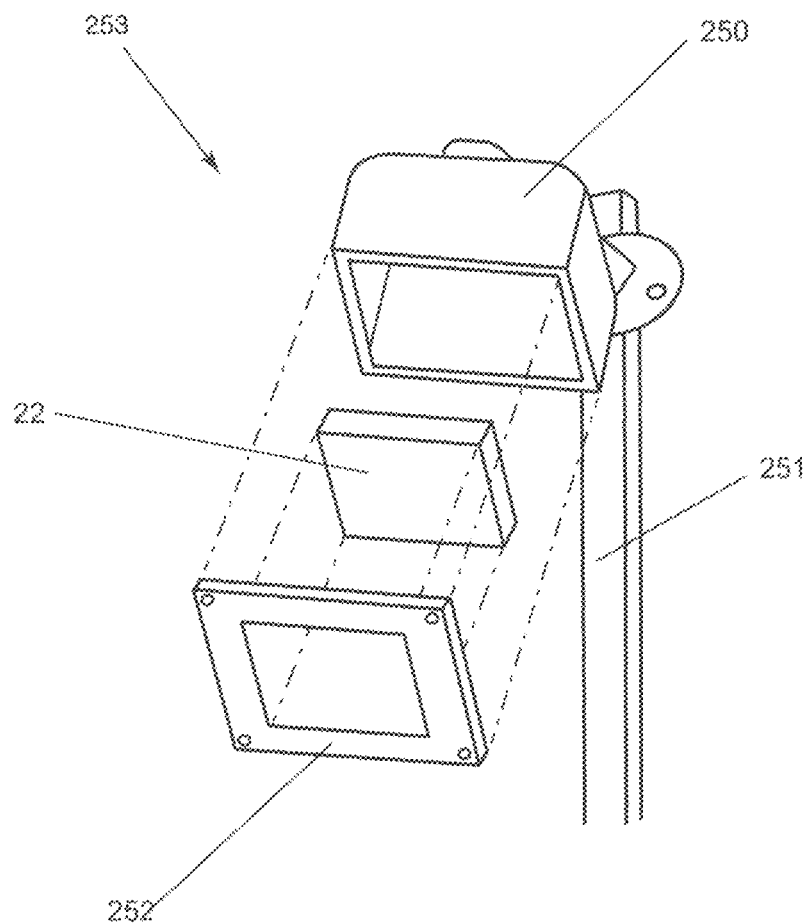
FIG. 4 shows an exterior energy sensor.

FIG. 4 illustrates an exterior application for energy sensor 22. Energy sensors 22, 28 are housed within an enclosure 253 whereas the enclosure base 260 acts as an acoustic chamber. Sensor 22 is affixed within enclosure base 250 and an enclosure cover 252 with screened cutout area is attached to enclosure base 250 encapsulating the sensor. The combined assembly, 253 is attached to a mounting bracket, 251, as shown. Enclosure 250 uses energy collection techniques associated with the dynamics of gunshot energy in an exterior environment, specifically energy wave propagation as the energy "bounce" is amplified within the sensor enclosure. By using enclosure with filters and algorithms, 250 false propagations from non-gunshot events are virtually eliminated. This novel approach provides for the use of the EAGL system for both interior use (a confined area) and exterior use.

Figure 5A:
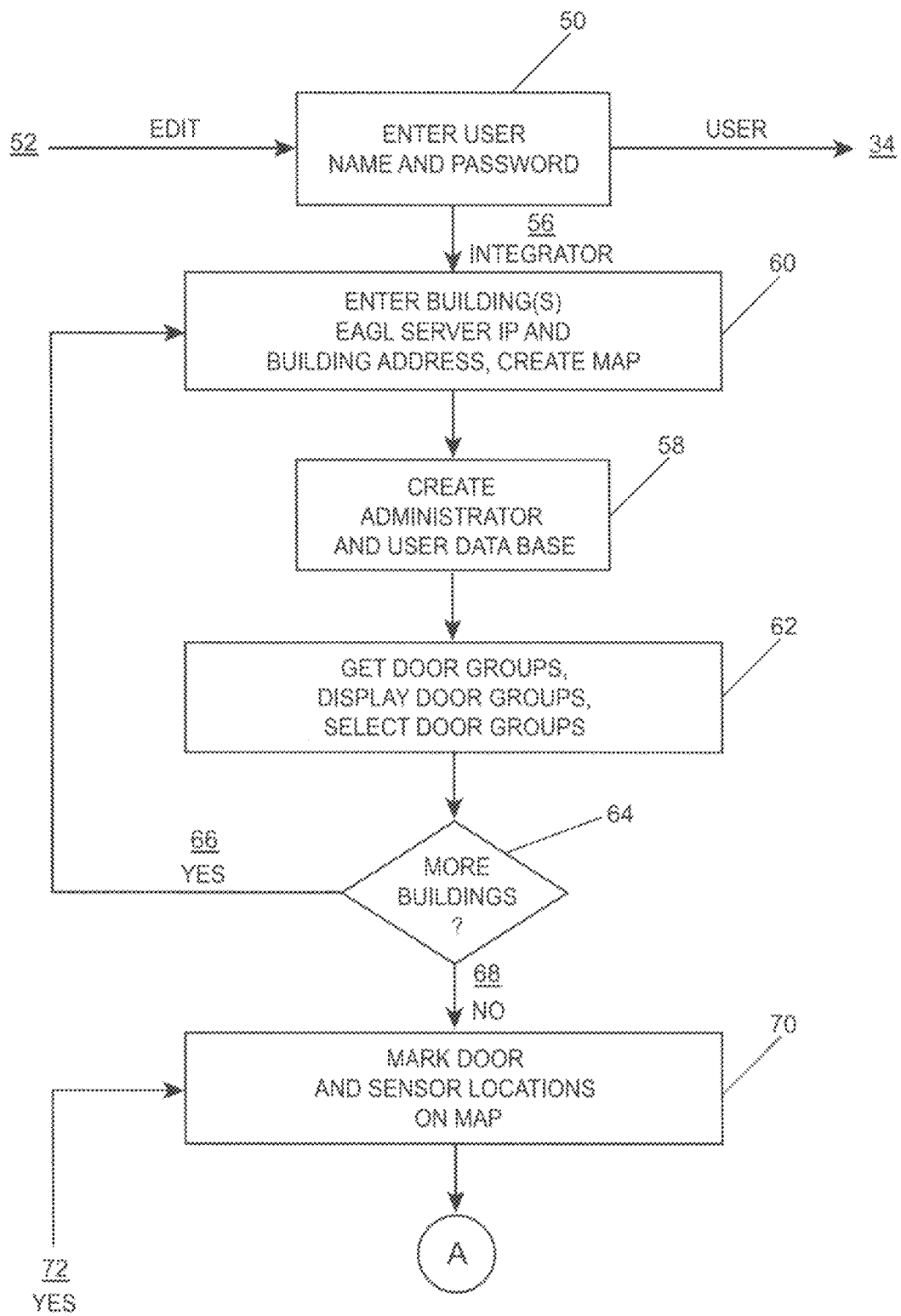
FIG. 5A is a flow chart that shows the EAGL system program conception.
Figure 5B:
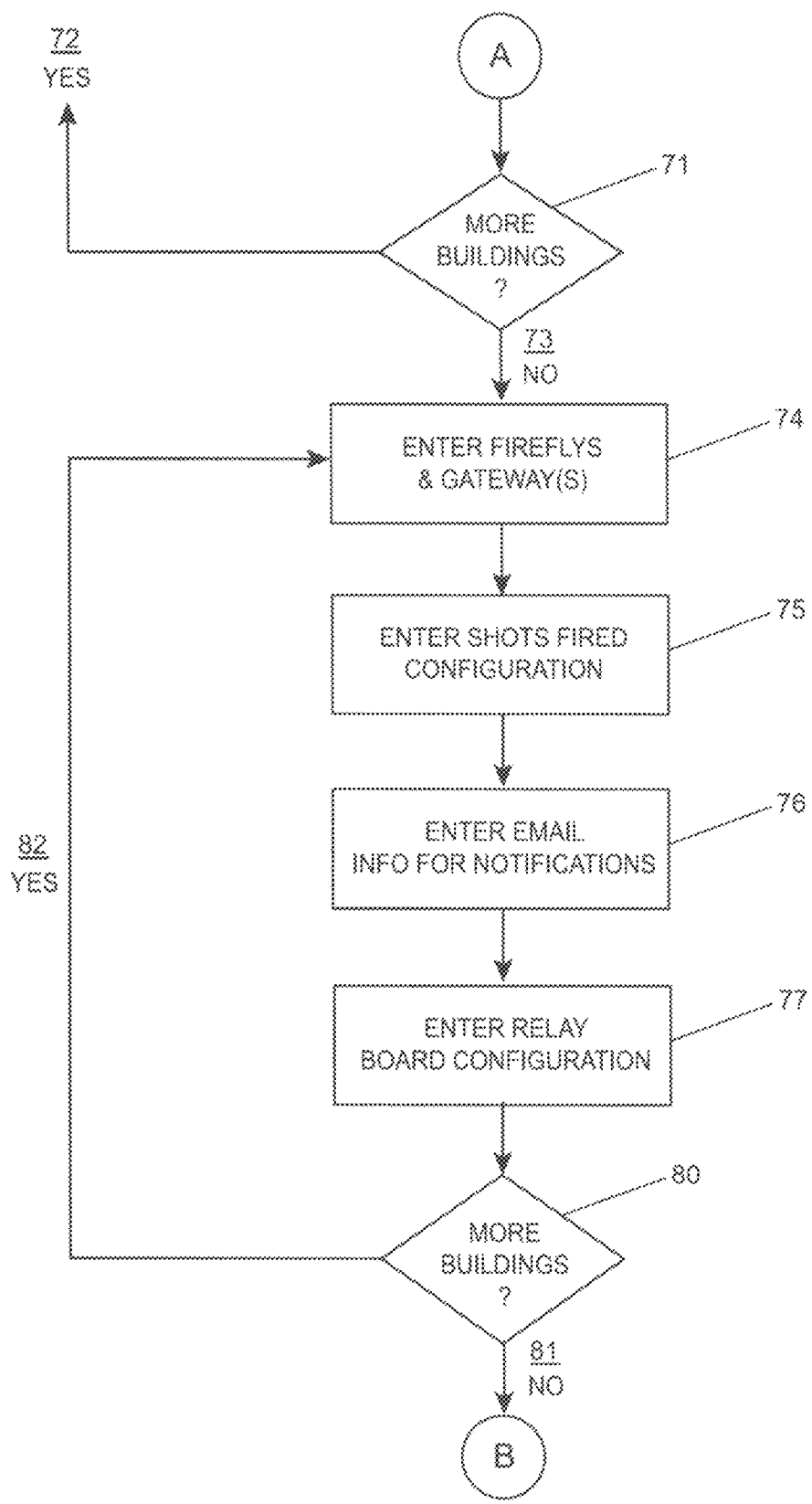
FIG. 5B is a continuation of the flow chart of FIG. 5A.
Figure 5C:
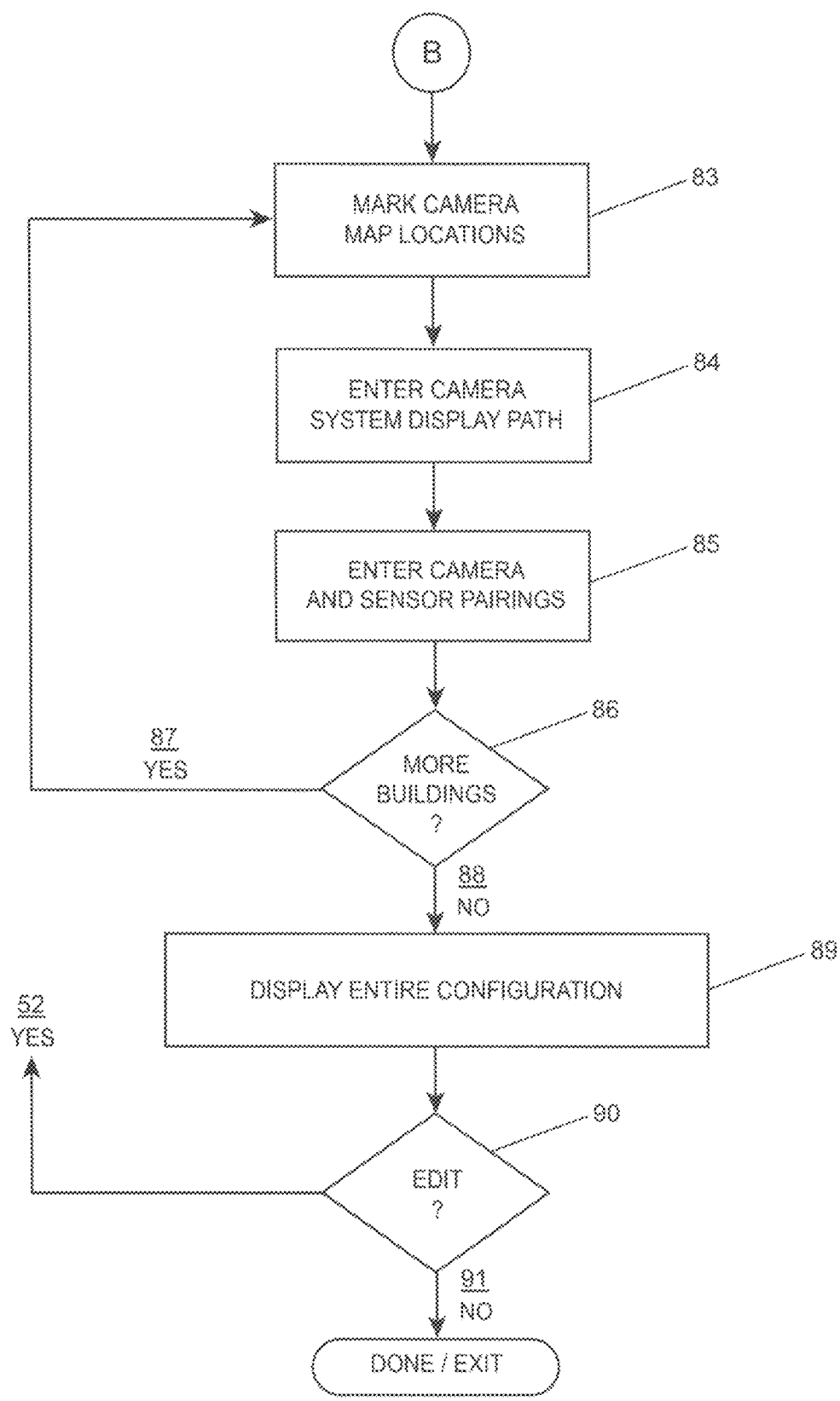
FIG. 5C is a continuation of the flow chart of FIG. 5B.

FIGS. 5A, 5B, and 5C area three-part flow chart showing the preferred method for programming the adaptive response of lockdown actions for execution upon a triggering event for a specific building. FIGS. 6A, 6B, 6C, 6D, and 6E correlate with FIGS. 5A, 5B, and 5C and represent user interface 43 displays and configuration menus corresponding to the processes listed in FIGS. 5A, 5B, and 5C.

This method for the adaptive response actions, which include lockdown measures, describes the preferred method; however, one or more systems can be added or deleted depending on the components contained in the subject buildings or outdoor system deployment areas. Interfacing with these components is accomplished through connection to and configuration of the EAGL system relay board 77. For example, if the building does not have a PA system, the system can still be used, but there will be no public announcement. In another example, the System can also trigger items such as flashing lights, smoke dispersion, distracting audio noises, and the like. This disclosure is intended to include these and similar variations.

FIG. 5A illustrates that in order to access the system, a user name and password must be entered 50. This presupposes the creating of a user name and password (not shown). User name and/or password can be edited 52 by user 34 only if user has credentialed administrator or integrator permissions. For example, a basic user cannot change an assigned user name and password. The planning of system setup configuration and programming can only be accessed by an administrator or integrator (not user) privileged in this preferred method. This information is supplied to integrator 56 to create a user and administrator database 58. Database 60 is populated with system physical address, server IP, user name, and system deployment site map. For each system deployment location and building name, the access control senior IP is entered. Next, door groups 62 are selected, entered, and displayed. EAGL system will import all the door groups 62 that are defined in FIG. 1, EAGL CPU 16 and allow the user to choose a door group 62 or multiple door groups to be locked during a lockdown adaptive response action in a building. If there are more buildings 64 a yes feedback loop 66 takes the administrator back to step 60 to enter the next building information. This procedure is repeated until all of the pertinent information for subject buildings is inputted.

Figure 6A:
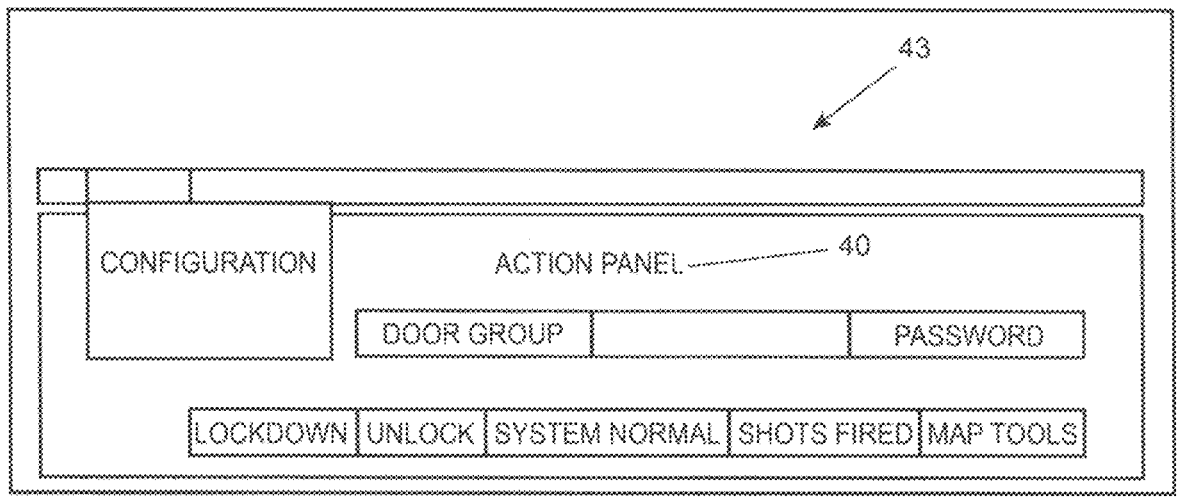
FIG. 6A depicts a user interface display of configuration menus.
Figure 6A:
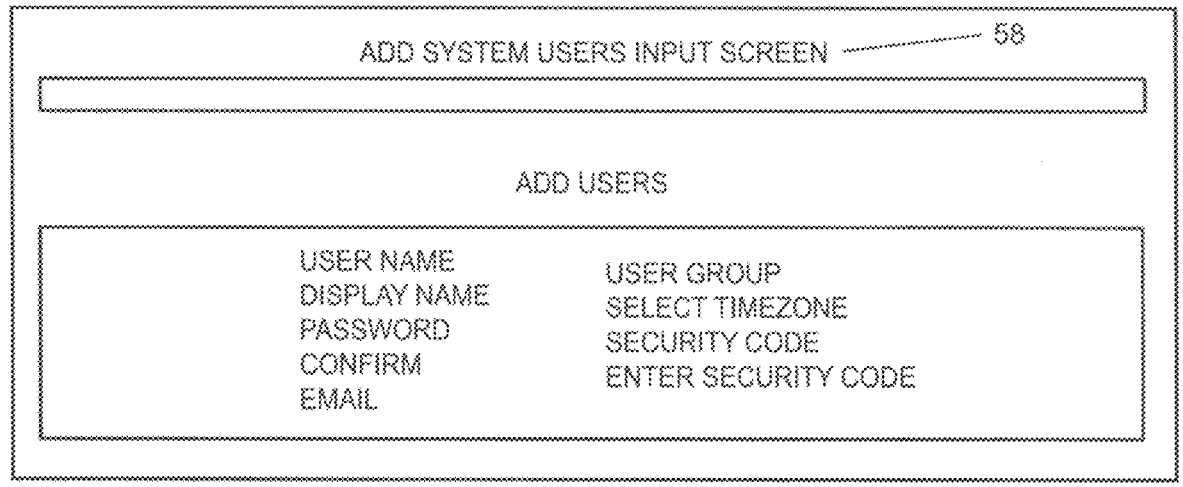
Figure 6A:
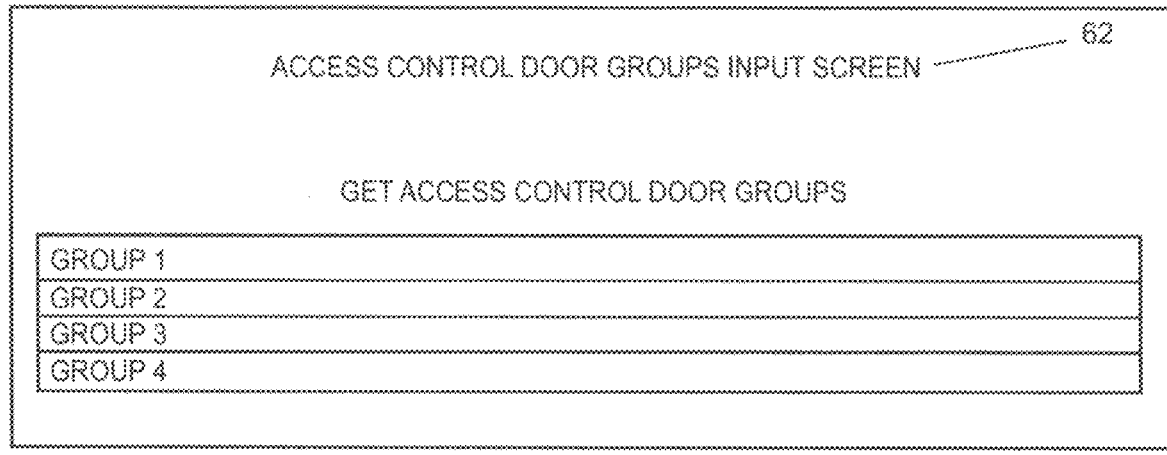

FIGS. 6A through 6E are depictions of screen shots of the EAGL system in operation. The displays can include other information or less information depending on the user preference, credential or permissions. FIG. 6A illustrates three user interface 43 windows displayed to the administrator/integrator when the associated configuration menu driven processes, are selected during user assignment and door group selection by action panel 40.

Figure 6B:
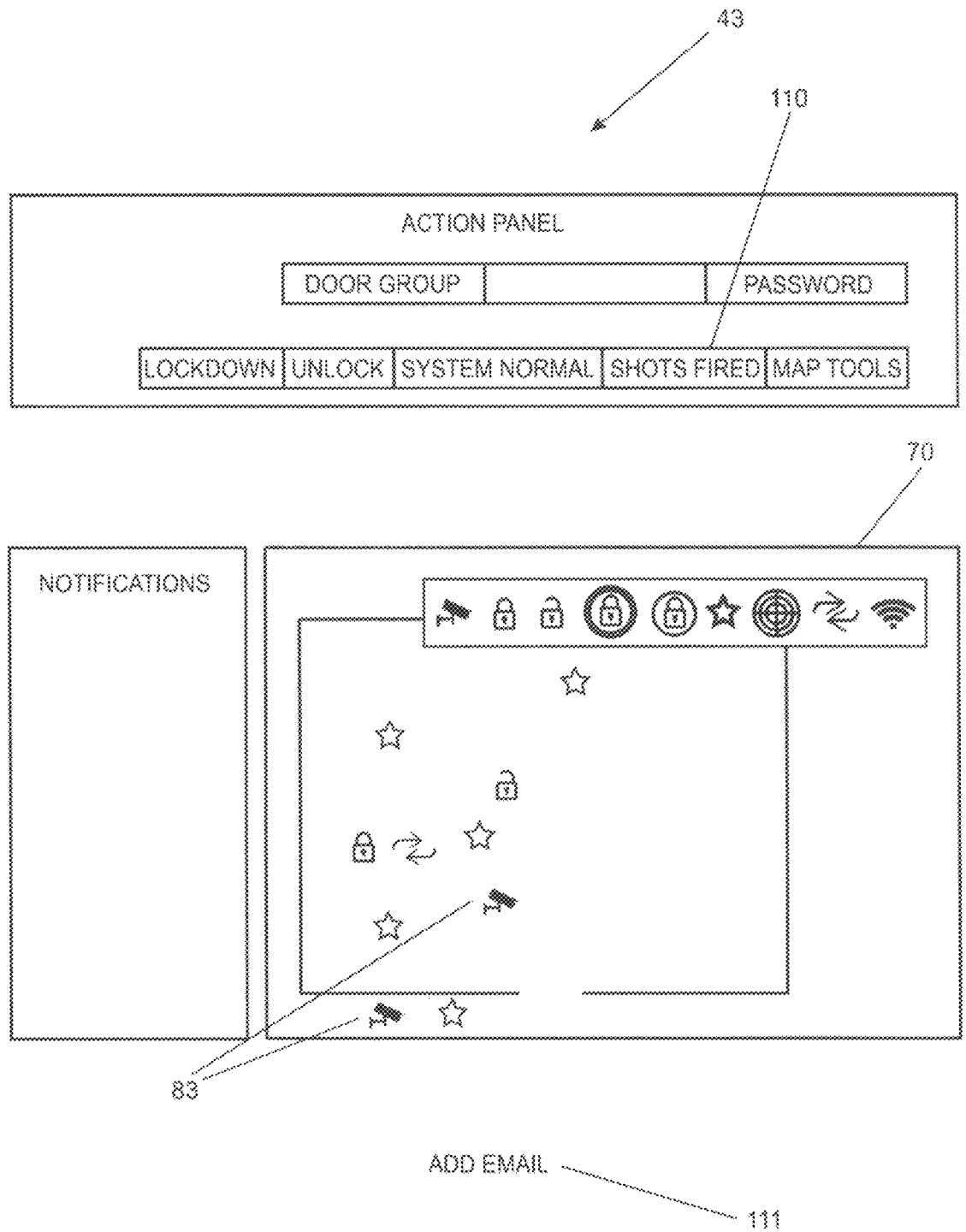
FIG. 6B depicts a user interface display attributes and e-mail menus.

Referring again to FIG. 5A, if there are no further buildings 68, the next step is to create a map 70, which preferably contains a facility name, address, access controlled door locations for each building, and a location of each energy sensor in each building or outdoor area. In a preferred system, once the building address is entered, the EAGL system displays a Google Map® of that building. The administrator can place the building at the center of the display area and size it accordingly. The administrator/integrator preferably selects from the list of the door names and drags icons to place them on the building in map section 70, marking their appropriate location as indicated in FIG. 6B and can place icons representing gunshot detectors on the map. The map presented in FIG. 6B also includes a legend displaying what devices or access vs. non-access controlled lock conditions, represented by icons, can be placed on the building map portraying devices, lock conditions, and system status. If there are more buildings 71 a feedback loop 72 repeats to step 70 until all of the building doors and gunshot detectors are mapped.

Once there are no further buildings for data entry 73 of FIG. 5B, EAGL system gateway(s) 74 assignments are then entered. Sensors 22, 28 are assigned individually or singularly paired to each gateway 74 so that the system accurately identities event location during threat detection processing.

After all gateway(s) 74 are enrolled, the preferred configuration method consists of entering shots fired configuration 75. The purpose of this step allows system functionality testing and initiates all EAGL system processes by simulating gunshot detection. When the "Shots Fired" button is selected on user interface 43, the defined parameters inputted during this configuration step allow the system to act as if it detected a gunshot initiating access control lockdown sequences, live-stream video feeds, and notification features that include e-mail, text, and telephone messaging. The primary intent of the shots fired configuration is to assign computer paths for a camera pairing to a sensor so that user interface 43 will display a live-stream from the assigned camera as well as present processing results or data to user/operator 34 of FIG. 5A. Once shots fired configuration 75 is inputted, the shots fired processing sequence is initiated by selecting shots fired button 110 of FIG. 6B, on user interface 43.

After the shots fired configuration is completed, the administrator/integrator enters the e-mail information 76 of FIG. 5B, for the system notifications sequencing. Notifications can include but are not limited to threat conditions and system health regarding external and/or internal power. External power interruptions or internal power fault conditions are processed through power monitoring circuits 17 of FIG. 1, and relay control portion of network switch and relay control 18 of FIG. 1 within EAGL system control unit 14 of FIG. 1. Relay board configuration 77 is used to setup operational modes for contact opening and closure essentially performing signal routing functionality, which includes but is not limited to connection with a wide area warning system 31 of FIG. 1, such as a public address 30 of FIG. 1, or other systems providing aural or visual warning devices such as klaxons or strobes. Events deemed as threat conditions are then processed through system EAGL CPU 16 of FIG. 1. The notification sequences are initiated autonomously when the system either detects power faults or threat conditions or allows condition information to be disseminated by e-mail or e-mail-to-text functions through computer path assignment. User interface 43 menu 111 is referenced in FIG. 6B. This concludes part one of a two-part notification structure. The second part of the notification structure involves dialer 19 of FIG. 1 initiating preprogrammed voice message outputs representative of the initiating condition. These voice message outputs are sent via telephone circuits and paths in addition to associative e-mail or e-mail to text messaging means. The notification process is independent of access control lockdown sequences and also allows data to be sent to more or other security command centers 32 FIG. 1.

If there are more buildings 80, a feedback loop 82 requests additional gateway(s) enrollment(s) 74 until no additional gateway(s) 81 exist and the there is no need for inputting additional shots fired configuration 78 information, notification e-mail information 76, or relay board configuration 77 data, and represents this configuration portion of system setup as complete.

Figure 6C:
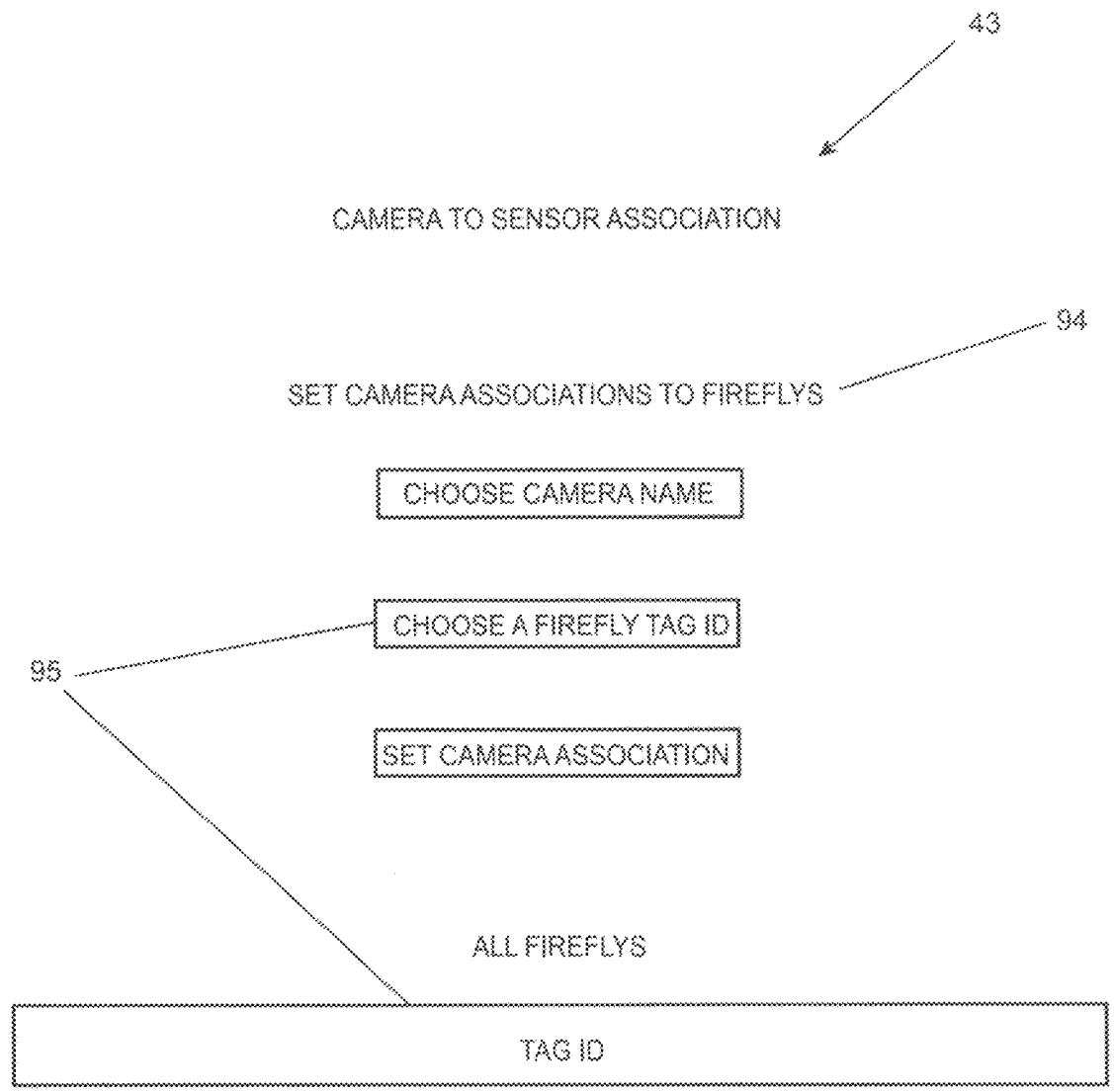
FIG. 6C depicts a user interface camera to sensor association.

Referring to FIG. 5C, the administrator/integrator then marks each camera map location 83 and enters camera system display path 84 by identifying the camera IP address, along with camera and sensor pairings 85 for each building. FIG. 6C illustrates camera association 94 screen presented during configuration. The purpose of this configuration allows the camera to provide a live stream capability when the energy sensor validates a threat condition. Essentially, the camera nearest the threat location is turned on and an image is presented to the system operator during a shooter event. Each sensor 22 of FIG. 1 has a unique tag ID 95 and is assigned to a camera nearest sensor 22. A camera can have multiple sensors assigned. Each camera IP is entered during inputting of map marker locations and after the camera is associated with nearest sensor, that information is presented on the display all settings page, FIG. 6E on user interface display 43. Referring to FIG. 5C, if there are additional buildings 86, feedback loop 87 allows for further camera setups 83 until ail buildings are included and no other building needs entry 88. Next, all setups are displayed 89 and the administrator can edit 90 any of the previous entries 52 to optimize the system until configuration is complete 91.

Figure 6D:
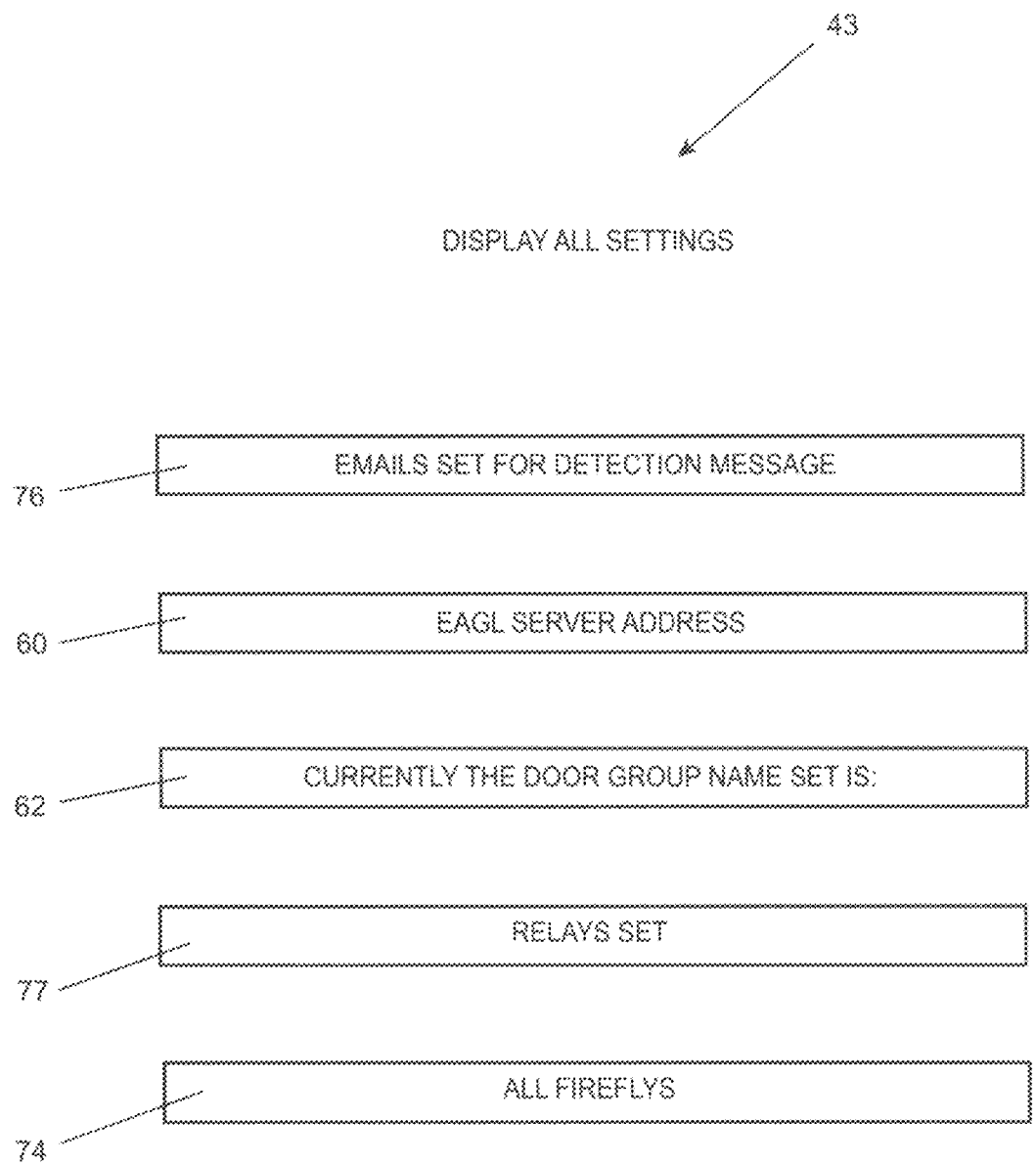
Figure 6E:
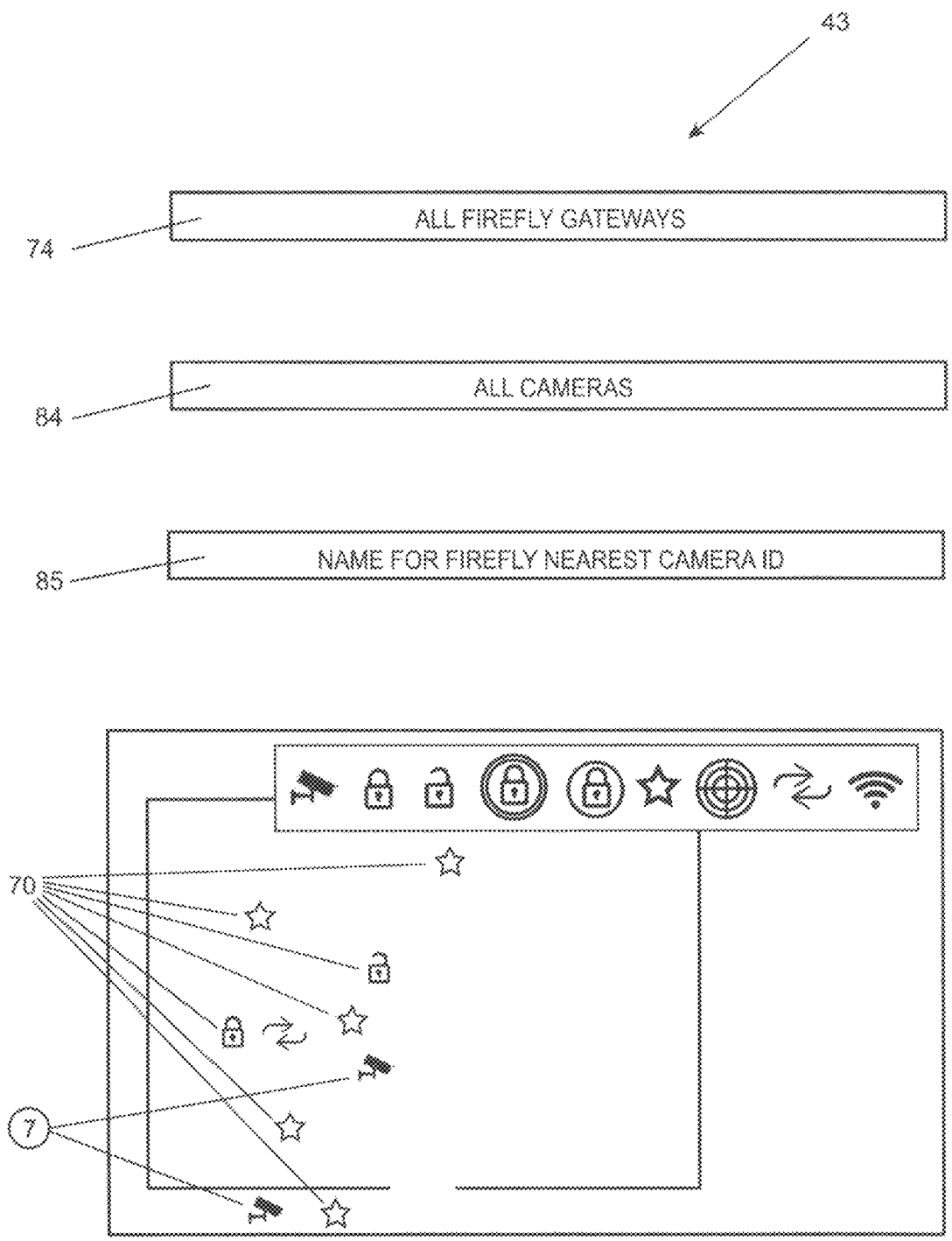
FIG. 6E depicts a continuation of FIG. 6D and map with icons.

FIGS. 6D and 6E portray a summarization of system device setups, configurations, and associations in conjunction with the flow chart of FIGS. 5A through 5C. These displays include e-mail sent for detection message 76, EAGL system server address 60, the current door group name 62, relays set 77, all energy sensors 74 all energy senor gateways 74, all cameras 84 and name of energy sensor nearest camera 85.

Another feature that can be included in the administrator/integrator programing of a dialer with emergency 911 and building security office and facility management is to alert them of a manual or gunshot trigger of the system (not shown).

Figure 7A:
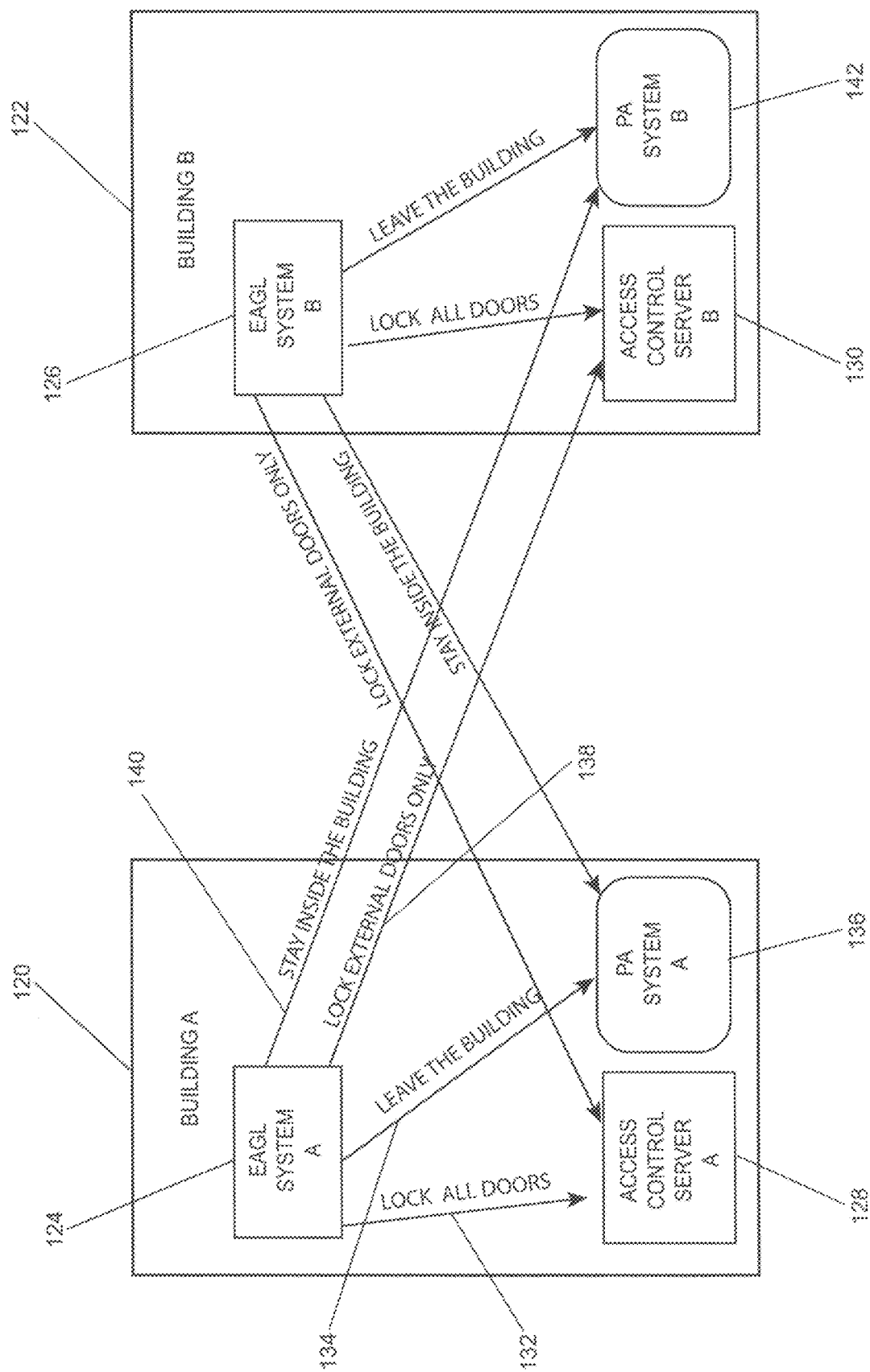
FIG. 7A shows multiple on-site EAGL systems during an event.

A unique feature of the presently claimed invention is the dynamic creation and selection of adaptive response actions for triggering in the event of an active shooter situation, or the like. FIG. 7A illustrates the system's ability to create and select adaptive response actions for active shooter events. FIG. 7A is an example of such an event situation involving two buildings each having an EAGL system. Although the example illustrates only two buildings, this disclosure specifically includes multiple buildings, which can use the same components and steps as set forth in the example. In this example, there is a building A 120 and a building B 122 both belonging to a single facility location but each building has separate EAGL systems. Building A 120 has an EAGL system A 124 along with access control server A 128, and building B 122 has EAGL system B 126 along with access control server B 130. During an active shooter event, inside building A 120, EAGL system A 124 sends a lock all doors command 132 to access control server A 128 and a leave the building message 134 to PA system A 136. Simultaneously, EAGL system A 124 sends a lock external doors command 138 to access control server B 130 and a stay inside building message 140 to PA system B 142. The inverse scenario can take place when an active shooter event is detected in building B 122.

Figure 7B:
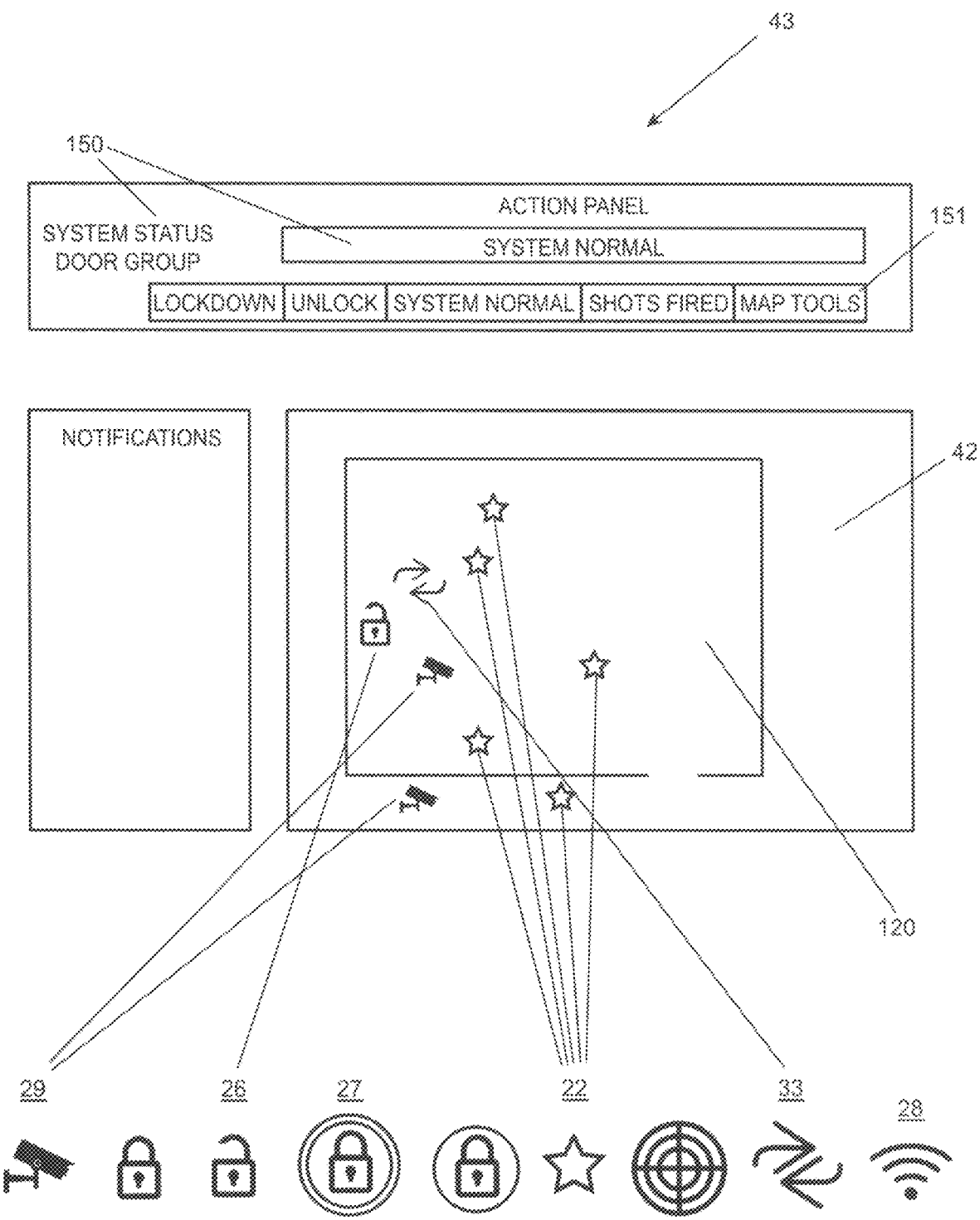
FIG. 7B shows user interface displaying a building in normal mode.

FIG. 7B portrays the user interface 43 representation of a single budding 120 in a system normal 150 status condition. Additionally, at the bottom of the figure of user interface 43, there is another graphic representing an enlargement of the icon legend available as map tools 151 dropdown menu item on map 42 section of user interface 43. The icons represent strategic locations of gunshot detector(s) 22, gateway(s) 33, gateway/combo(s) 28, access controlled door(s) unlock 26 with current door conditions, and security camera(s) 29. Access controlled doors are preferably displayed as colored padlock icons representing four states. For example, these can include but are not limited to, system normal in blue, unlock in green, lockdown in red, and doors not in door group in purple. EAGL system control unit 14 in FIG. 1 interfaces with access control server 24 in FIG. 1 and, depending on threat vs. non-threat situations, displays current door lock states on user interface 43. A non-threat situation is presented as a system normal 150 status condition, the green padlock icon portrays the access controlled door as being in an unlock state typical of building access during business hours. If a facility location has multiple on-site EAGL system, each System has the ability to be integrated with other EAGL system control units 14 in FIG. 1. A preselected number of doors are unlocked 26 during normal operational mode to allow building access during normal business hours. Some doors can be locked to restrict access (not shown). Energy sensors 22 are strategically placed inside of building 120 so that a location can be determined by triangulation, or similar manner based on the sensor data. Audio/visual systems or cameras 29 are also strategically placed in building 120 so they can be directed, either automatically or manually towards a location of a detected gunshot.

Figure 7C:
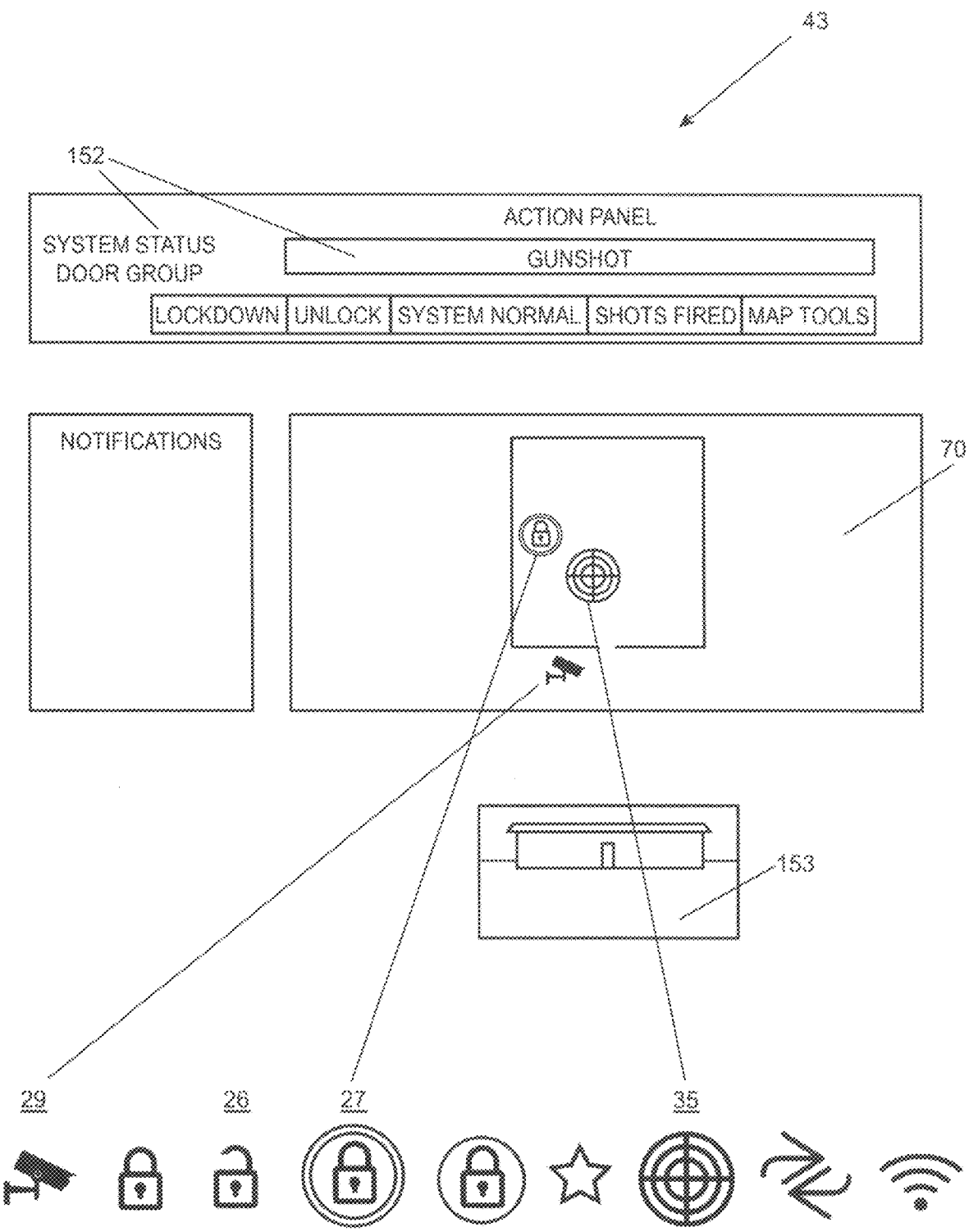
FIG. 7C shows user interface displaying a building in gunshot detection mode.

FIG. 7C shows an example of a detected gunshot condition. User Interface 43 shows a gunshot 152 status condition, the access controlled door condition changed state from unlock 26 in FIG. 7B to lockdown 27, sensor 22 which detected the gunshot and provided gunshot location 35 coordinates. Additionally, a window appears at the bottom of map 70 section on user interface 43 representing live-stream video 153 as camera 29 is associated with the sensor detecting the gunshot. In this situation, the door is automatically locked 27 to contain the intruder and other doors in the building can be opened 26 (not shown) to allow persons to exit the building.

When a gunshot is detected the EAGL system will execute the adaptive response actions that were preprogrammed per building, lock the predefined doors per building, and display the gunshot event location. It will then send preselected PA messages, display the video stream of the camera near the incident location, and alternatively dial 911 and all other programmed numbers. The EAGL system also has the capability to send e-mail and e-mail to text messages informing parties not only of threat conditions but also provide valuable information for decision making regarding both escape routes from the violence area and informative directions to prevent affected parties and law enforcement from becoming casualties of the incident. The preferred software is operating on a Linux based computer that allows the execution of the lockdown sequences in a very short period and is functional twenty-four hours a day, seven days a week.

The new features are the broad integration of this System with multiple external systems and the ability to control access controlled doors remotely. The traditional way of locking down buildings manually by human intervention does not provide instant lockdown during a threat incident and diminishes precious time needed for building occupants to escape and survive an active shooter condition. The presently claimed system response time is approximately twenty seconds from the time the gunshot is detected to the time the door(s) are locked and law enforcement notified.

Although the presently claimed invention has been described in detail with particular reference to these preferred embodiments, other embodiments can achieve the same results. Variations and modifications of the presently claimed invention will be obvious to those skilled in the art and it is intended to cover all such modifications and equivalents. The entire disclosures of all references, applications, patents, and publications cited above, are hereby incorporated by reference.

What is claimed is:

1. A method comprising:
   detecting an energy level of a potential gunshot threat with at least one energy sensor;
   capturing the detected energy level;
   validating the energy level for a gunshot threat using a triple validation system comprising:
      determining if the energy level meets a predetermined minimum and maximum threshold;
      determining if a waveform of the energy level meets a predetermined slope change; and
      if the energy level meets the predetermined minimum and maximum energy threshold and the waveform meets the predetermined slope change, determining if the energy level conforms to a predetermined ballistic signature; and
   automatically activating at least one predetermined security measure upon validation of the energy level for a gunshot threat.

2. The method of claim 1 wherein the step of determining if the energy level conforms to a predetermined ballistic signature comprises:
   reconstructing the waveform into a frequency;
   transforming the waveform;
   generating a ballistic signature; and
   comparing the ballistic signature to a ballistic data base.

3. The method of claim 1 further comprising a step of providing a plurality of predetermined sequences based on user defined parameters comprising a building layout, a number of doors, a location of the detected gunshot and whether the building is populated.

4. The method of claim 1 wherein the predetermined security measures comprise locking a predetermined number of doors to prevent the active shooter from moving freely about or exiting from a predetermined area.

5. The method of claim 1 further comprising providing location coordinates of the detected gunshot.

6. The method of claim 5 further comprising directing at least one camera towards the location coordinates.

7. The method of claim 1 wherein the predetermined security measures further comprise mapping a status of all doors in one or more buildings, automatically calling 911 advising of the detection, notifying subscribed mobile devices of the detection, and activating a Public Announcement (PA) system with a preprogramed announcement.

8. The method of claim 1 further comprising attenuating noise to the at least one energy sensor by providing an enclosure for the at least one energy sensor.

9. The method of claim 1 wherein the steps of determining if the energy level meets a predetermined minimum and maximum threshold and determining if a waveform of the energy level meets a predetermined slope change are performed by energy sensor circuitry and firmware.

10. A non-transitory computer-executable storage medium comprising program instructions to implement automatic security measures comprising:
   program instructions that cause an energy level to be detected of a potential gunshot threat from at least one energy sensor;
   program instructions that cause the detected energy level to be captured;
   program instructions that cause the captured energy level to be validated by a triple validation system comprising:

program instructions that determine if the energy level meets a predetermined minimum and maximum threshold;

program instructions that determine if a waveform of the energy level meets a predetermined slope change; and if the energy level meets the predetermined minimum and maximum energy threshold and the waveform meets the predetermined slope change, program instructions that determine if the energy level conforms to a predetermined ballistic signature; and program instructions that cause an automatic activation at least one predetermined security measure upon validation of the energy level for a gunshot threat.

11. The non-transitory computer-executable storage medium of claim 10 wherein the program instructions that determine if the energy level conforms to a predetermined ballistic signature comprises:

program instructions that reconstruct the waveform into a frequency;

program instructions that transform the waveform;

program instructions that generate a ballistic signature; and program instructions that compare the ballistic signature to a ballistic data base.

12. The non-transitory computer-executable storage medium of claim 10 wherein the program instructions that cause an automatic activation at least one predetermined security measure comprises inputting user defined parameters comprising a building layout, a number of doors, a location of the detected gunshot and whether the building is populated.

13. The non-transitory computer-executable storage medium of claim 10 wherein the predetermined security measures comprise program instructions that cause locking of a predetermined number of doors to prevent the active shooter from moving freely about or exiting from a predetermined area.

14. The non-transitory computer-executable storage medium of claim 10 further program instructions that cause location coordinates of the detected gunshot be provided.

15. The non-transitory computer-executable storage medium of claim 14 further comprising program instructions to direct at least one camera towards the location coordinates.

16. The non-transitory computer-executable storage medium of claim 10 wherein the predetermined security measures further comprise program instructions that cause a status of all doors in one or more buildings to be mapped, program instructions that cause an automatic calling of 911 advising of the detection, notifying subscribed mobile devices of the detection, and activating a Public Announcement (PA) system with a preprogramed announcement.

17. The non-transitory computer-executable storage medium of claim 10 wherein the program instructions that determine if the energy level meets a predetermined minimum and maximum threshold maximum threshold and the program instructions that determine if a waveform of the energy level meets a predetermined slope change performed by energy sensor.

18. A system for automatically implementing security measures comprising:

a plurality of energy sensors for detecting an energy level of a potential gunshot threat;

one or more Central Processing Units (CPUs), in communication with the one or more energy sensor, and configured to collect data inputs from more than one source and to output at least one predetermined security measure;

a triple validation apparatus for validating the energy level for the gunshot threat, comprising a first validation and second validation within the one or more energy sensors and a third validation within the one or more CPUs, wherein the triple validation apparatus:

determines if the energy level meets predetermined minimum and maximum thresholds and whether a waveform of the energy level meets a predetermined slope change; and if the energy level meets the predetermined minimum and maximum energy thresholds and the waveform meets the predetermined slope change, determines if the energy level conforms to a predetermined ballistic signature; and a plurality of predetermined security sequences based on a building layout, a number of doors, a location of the at least one detected gunshot, and whether the building is populated.

19. The system of claim 18 wherein the doors comprise remote locking doors.

20. The system of claim 18 wherein the one or more CPUs and one or more energy sensors are configured to providing location coordinates of a detected and validated gunshot.

21. The system of claim 20 further comprising a plurality of cameras that can be directed towards the location coordinates.

22. The system of claim 20 further comprising a map with a status of all doors in one or more buildings, an automatic 911 mobile device for advising of the detected gunshot, notifying subscribed mobile devices of the detected gunshot, and a Public Announcement (PA) system with a preprogramed announcement.

23. The system of claim 18 further comprising a housing for the at least one energy sensor for amplifying noise to the one or more energy sensors.

* * * * *